US009016050B2

(12) United States Patent
Fischer et al.

(10) Patent No.: US 9,016,050 B2
(45) Date of Patent: Apr. 28, 2015

(54) AFTERTREATMENT SYSTEM INCORPORATING HYDROLYSIS CATALYST WITH PARTICULATE FILTRATION AND SCR

(71) Applicant: Caterpillar Inc., Peoria, IL (US)

(72) Inventors: Amy E. Fischer, Peoria, IL (US); Matthew E. Leustek, Germantown Hills, IL (US); Justin W. McMenamy, Edwards, IL (US); Brandon T. Shull, Peoria, IL (US); Ronald G. Silver, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 177 days.

(21) Appl. No.: 13/719,404

(22) Filed: Dec. 19, 2012

(65) Prior Publication Data

US 2014/0165540 A1    Jun. 19, 2014

(51) Int. Cl.
| | |
|---|---|
| *F01N 3/00* | (2006.01) |
| *F01N 3/10* | (2006.01) |
| *F01N 3/20* | (2006.01) |
| *F01N 3/035* | (2006.01) |
| *F01N 13/00* | (2010.01) |

(52) U.S. Cl.
CPC *F01N 3/10* (2013.01); *F01N 3/103* (2013.01); *F01N 3/2066* (2013.01); *F01N 3/035* (2013.01); *F01N 2240/40* (2013.01); *F01N 13/0097* (2014.06); *F01N 13/009* (2014.06)

(58) Field of Classification Search
CPC ... F01N 3/0842; F01N 3/0814; F01N 3/2066; F01N 9/002; F01N 13/02; F02D 41/029; F02D 41/0275

USPC .................... 60/295, 297, 301, 324
See application file for complete search history.

(56) References Cited

U.S. PATENT DOCUMENTS

| | | | |
|---|---|---|---|
| 5,832,720 A | 11/1998 | Svahn | |
| 6,444,177 B1 * | 9/2002 | Muller et al. | 422/177 |
| 8,539,758 B2 * | 9/2013 | Muller-Haas | 60/295 |
| 2004/0040288 A1 * | 3/2004 | Jacob et al. | 60/286 |
| 2008/0041050 A1 * | 2/2008 | Doring | 60/605.1 |
| 2008/0127638 A1 | 6/2008 | Vaarkamp et al. | |
| 2008/0141661 A1 | 6/2008 | Voss et al. | |

(Continued)

FOREIGN PATENT DOCUMENTS

| | | | |
|---|---|---|---|
| JP | 2006183507 | | 7/2006 |
| JP | 2006183507 A | * | 7/2006 |
| JP | 2010242515 A | * | 10/2010 |

*Primary Examiner* — Thomas Denion
*Assistant Examiner* — Patrick Maines
(74) *Attorney, Agent, or Firm* — William R. Tinker (57) ABSTRACT

An aftertreatment system is disclosed. The aftertreatment system can include a hydrolysis catalyst disposed within a first canister adjacent to a downstream end of the first canister and a nozzle positioned to inject reductant into the first canister upstream of the hydrolysis catalyst. A particulate collection device, which may be catalyzed to promote $NO_X$ reduction in the presence of the reductant, can be disposed within a second canister of the aftertreatment system adjacent to an upstream end thereof. An exhaust conduit can extend from the downstream end of the first canister to the upstream end of the second canister. An interior volume within the exhaust conduit can extend from an upstream end adjacent to and in fluid communication with the hydrolysis catalyst to a downstream end adjacent to and in fluid communication with the particulate collection device.

16 Claims, 2 Drawing Sheets

(56) References Cited

U.S. PATENT DOCUMENTS

| | | | |
|---|---|---|---|
| 2008/0175776 A1* | 7/2008 | Jacob | 423/213.2 |
| 2009/0145117 A1* | 6/2009 | Doring et al. | 60/286 |
| 2009/0151334 A1* | 6/2009 | Kim | 60/286 |
| 2009/0193794 A1* | 8/2009 | Robel et al. | 60/295 |
| 2010/0077739 A1* | 4/2010 | Rodman et al. | 60/301 |
| 2011/0047990 A1* | 3/2011 | Nagaoka et al. | 60/297 |
| 2011/0079003 A1 | 4/2011 | Sun et al. | |
| 2011/0099978 A1 | 5/2011 | Davidson et al. | |
| 2011/0146252 A1 | 6/2011 | Silver et al. | |
| 2011/0192143 A1 | 8/2011 | Andersson et al. | |
| 2011/0277454 A1 | 11/2011 | Christianson et al. | |

\* cited by examiner

AFTERTREATMENT SYSTEM INCORPORATING HYDROLYSIS CATALYST WITH PARTICULATE FILTRATION AND SCR

TECHNICAL FIELD

The present disclosure is directed to an aftertreatment system and, more particularly, to an aftertreatment system that implements selective catalytic reduction (SCR) with particulate filtration and incorporates a hydrolysis catalyst.

BACKGROUND

Internal combustion engines, including diesel engines, gasoline engines, gaseous fuel-powered engines, and other engines known in the art exhaust a complex mixture of air pollutants, which can include particulate matter (PM) and/or soot, hydrocarbons, and gaseous compounds including, inter alia, the oxides of nitrogen ($NO_X$) included therein. Due to increased awareness of the environment, exhaust emission standards have become more stringent, and the amount of pollutants exhausted including, inter alia, $NO_X$ emitted to the atmosphere by an engine may be regulated depending on the type of engine, size of engine, and/or class of engine.

In order to comply with the regulation of $NO_X$, some engine manufacturers have implemented a strategy called selective catalytic reduction (SCR). SCR is a process where a reductant, most commonly urea (($NH_2$)$_2$CO) or a water/urea solution, is selectively injected into the exhaust gas stream of an engine and absorbed onto a downstream substrate. The injected urea solution decomposes into ammonia ($NH_3$), which reacts with $NO_X$ in the exhaust gas to form water ($H_2O$) and diatomic nitrogen ($N_2$). However, numerous complexities and trade-offs may be present in the implementation of various strategies to control emissions, including, inter alia, those which can be presented by interrelationships between $NO_X$ conversion efficiency, package sizing, cost, system backpressure, and fuel efficiency.

U.S. Patent Publication No. 2011/0079003 A1 (the '003 publication) to Sun et al., filed as U.S. patent application Ser. No. 12/573,469 on Oct. 5, 2009, discloses an aftertreatment system which includes an SCR catalyst and a reductant system. The reductant system includes an injector or nozzle that introduces a reductant into an exhaust flow which is introduced to the SCR catalyst via an exhaust pipe. The exhaust pipe includes a straight part and a curved part or bend upstream from the straight part, and the nozzle is mounted in the bend. The length of the straight part of the exhaust pipe or distance between the nozzle and SCR catalyst may be sufficiently long to achieve the mixing of reductant into the exhaust flow and provide adequate dwell time for the urea reductant to convert into NH3. In one embodiment, the straight part of the pipe includes a mixer. An indentation is provided in an outer curve of the upstream bend and additionally provides a recessed area or pocket for the nozzle to be located. The indentation may help prevent the formation of the deposits, which may cause higher backpressure and disrupt the flow and mixing of urea reductant into the exhaust flow, by directing the droplets or spray from the nozzle down the straight part of the exhaust pipe.

The present disclosure is directed to mitigating or eliminating one or more of the drawbacks discussed above.

SUMMARY

One aspect of the present disclosure is directed to an aftertreatment system. The aftertreatment system can include a hydrolysis catalyst disposed within a first canister adjacent to a downstream end of the first canister. Additionally, the aftertreatment can include a nozzle positioned to inject reductant into the first canister upstream of the hydrolysis catalyst. The aftertreatment system can further include a particulate collection device which can be disposed within a second canister adjacent to an upstream end of the second canister. The particulate collection device can be catalyzed to promote $NO_X$ reduction in the presence of the reductant. An exhaust conduit can extend from the downstream end of the first canister to the upstream end of the second canister and an interior volume within the exhaust conduit can extend from an upstream end adjacent to and in fluid communication with the hydrolysis catalyst to a downstream end adjacent to and in fluid communication with the particulate collection device.

A further aspect of the present disclosure is directed to a power system. The power system can include a combustion engine as well as an exhaust passageway connected to receive an exhaust flow from the combustion engine and fluidly communicate the exhaust flow to an aftertreatment system. The aftertreatment system can include a first canister having an upstream end connected in fluid communication with the exhaust passageway, a second canister, and an exhaust channel. The exhaust channel can extend from a downstream end of the first canister to an upstream end of the second canister. A hydrolysis catalyst can be disposed within the first canister adjacent to the downstream end of the first canister, and a nozzle can be positioned to inject reductant into the first canister upstream of the hydrolysis catalyst. Additionally, a particulate collection device can be disposed within the second canister adjacent to an upstream end of the second canister, and the particulate collection device catalyzed to promote $NO_X$ reduction in the presence of the reductant. Furthermore, a reduction device can be disposed within the second canister downstream of the particulate collection device, and the reduction device can be catalyzed to promote $NO_X$ reduction in the presence of the reductant. An internal volume of the exhaust conduit can fluidly communicate the exhaust flow from an upstream end adjacent to and in fluid communication with a rear face of the hydrolysis catalyst to a downstream end adjacent to and in fluid communication with a front face of the particulate collection device.

Yet another aspect of the present disclosure is directed to an aftertreatment system. The aftertreatment system can include a first hydrolysis catalyst in fluid communication with an exhaust flow directed through the aftertreatment system. A nozzle can be included and can be positioned to inject reductant into the exhaust flow upstream of the first hydrolysis catalyst. The aftertreatment system can further include a particulate collection device catalyzed to promote $NO_X$ reduction in the presence of the reductant as well as an exhaust conduit having an internal volume. The internal volume of the exhaust conduit can fluidly communicate the exhaust flow from an upstream end adjacent to and in fluid communication with a rear face of the first hydrolysis catalyst to a downstream end adjacent to and in fluid communication with a front face of the particulate collection device. Furthermore, the aftertreatment system can include a reduction device catalyzed to promote $NO_X$ reduction in the presence of the reductant downstream of the particulate collection device.

DETAILED DESCRIPTION

Figure 1:
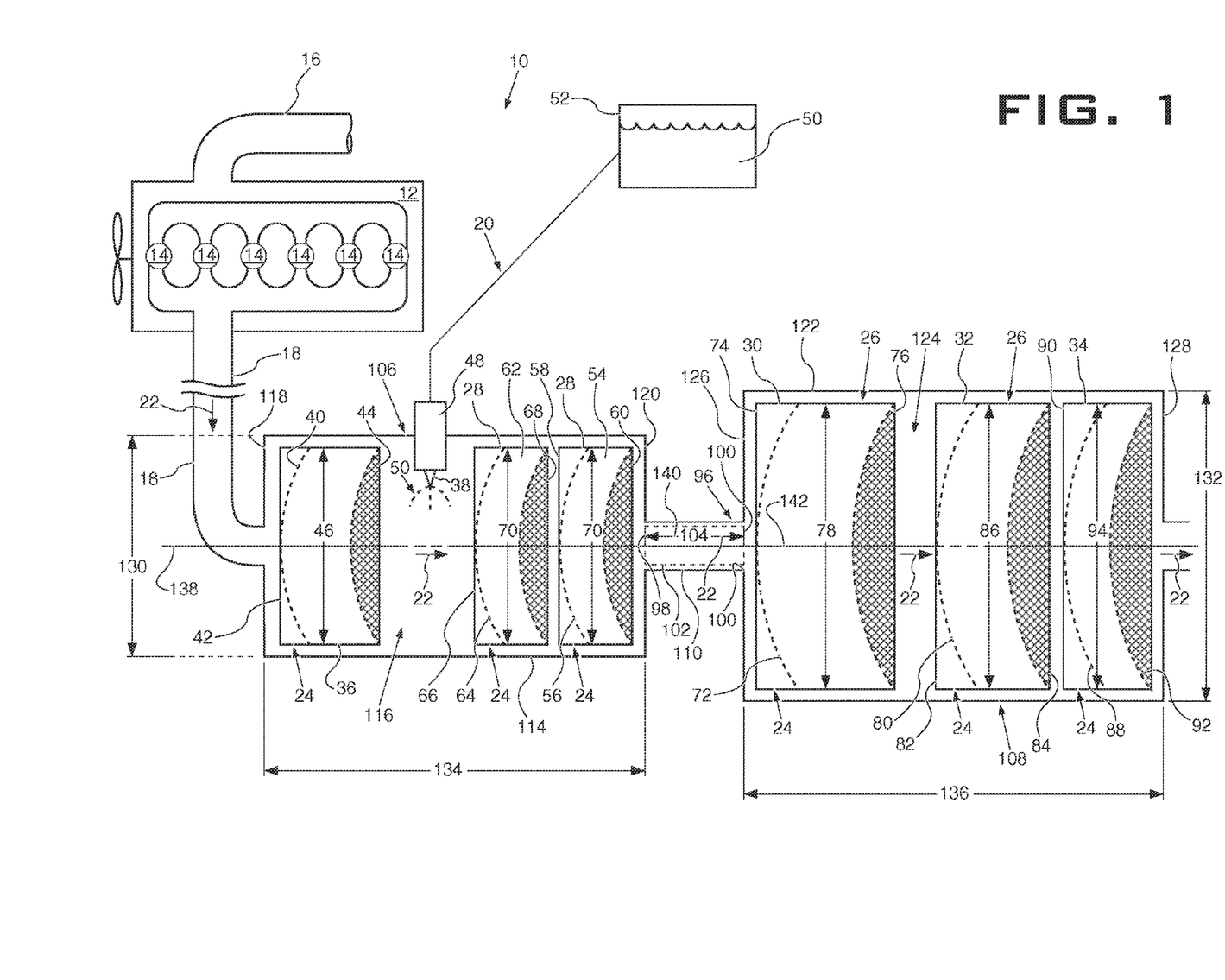
FIG. 1 is a schematic view and diagrammatic illustration of an exemplary disclosed exhaust aftertreatment system.

FIG. 1 illustrates an exemplary power system 10. For the purposes of this disclosure, power system 10 is depicted and described as a diesel-fueled, internal combustion engine. However, it is contemplated that power system 10 can embody any other type of combustion engine, such as, for example, a gasoline or a gaseous fuel-powered engine. Power system 10 can include an engine block 12 that at least partially defines a plurality of cylinders 14, and a plurality of piston assemblies (not shown) disposed within cylinders 14 to form combustion chambers. It is contemplated that power system 10 may include any number of combustion chambers and that the combustion chambers may be disposed in an "in-line" configuration, a "V" configuration, or in any other conventional configuration.

Multiple separate sub-systems may be included within power system 10. For example, power system 10 can include an air induction system which can be configured to direct air or an air/fuel mixture through an air or air/fuel passageway 16 into the combustion chambers within the cylinders 14 of the engine block 12 for subsequent combustion. In one embodiment, power system 10 includes an exhaust passageway 18 as well as an aftertreatment system 20. In one embodiment, the exhaust passageway 18 routes an exhaust flow 22, which can include the byproducts of the combustion process such as particulate matter (PM) and/or soot, hydrocarbons, and gaseous compounds including, inter alia, the oxides of nitrogen ($NO_X$) included therein, from the cylinders 14 of the engine block 12 to the aftertreatment system 20.

In one embodiment, the aftertreatment system 20 receives exhaust flow 22 from the exhaust passageway 18 and directs the exhaust flow 22 through a sequence of fluidly connected treatment devices 24 to condition the exhaust flow 22 before the exhaust flow 22 is directed to the atmosphere. In one embodiment, included in the aftertreatment system 20 are one or more treatment devices 24 which can include one or more hydrolysis catalysts 28, and one or more treatment devices 26 which are catalyzed to promote reduction of an exhaust constituent (such as $NO_X$) of the exhaust flow 22 in the presence of a reductant (such as reductant 50, as disclosed herein), (exhaust constituent/$NO_X$ reduction treatment devices 26), which in one embodiment, can include a combined particulate collection and reduction device 30 and a reduction device 32. In one example, the aftertreatment system 20 includes one or more hydrolysis catalysts 28, a combined particulate collection and reduction device 30 downstream of the one or more hydrolysis catalysts 28, and a reduction device 32 downstream of the combined particulate collection and reduction device 30. In certain embodiments, the treatment devices 24 of the aftertreatment system 20 can also include an oxidation ($AMO_X$) catalyst 34 which may be downstream of the reduction device 32, and optionally, an oxidation catalyst 36 positioned upstream of the one or more a hydrolysis catalysts 28. Furthermore, the aftertreatment system 20 also includes an injector nozzle 38 upstream of the one or more a hydrolysis catalysts 28, and downstream of the oxidation catalyst 36, if provided.

As provided above, aftertreatment system 20 may optionally include an oxidation catalyst 36. The oxidation catalyst 36, if provided, can be in fluid communication with the exhaust passageway 18 and fluidly positioned to engage and condition the exhaust flow 22 within the aftertreatment system 20 upstream of the injector nozzle 38. In one embodiment, the oxidation catalyst 36 is a diesel oxidation catalyst (DOC). As a DOC, oxidation catalyst 36 may include a porous ceramic honeycomb structure, a metal mesh, a metal or ceramic foam, or any other suitable substrate 40 coated with or otherwise containing a catalyzing material, for example a precious metal, that catalyzes a chemical reaction to alter a composition of the $NO_X$ in the exhaust flow 22 passing through the oxidation catalyst 36 such that a concentration of NO to $NO_2$ in the exhaust flow 22 exiting the oxidation catalyst 36 is about 1:1. For example, the substrate 40 of the oxidation catalyst 36 may include platinum that facilitates a conversion of NO to $NO_2$. The substrate 40 of the oxidation catalyst 36 can also have a front face 42 which represents an exhaust flow 22 inflow surface and a rear face 44 which represents an exhaust flow 22 outflow surface wherein the residence time of the exhaust flow 22 inside the substrate 40 may be defined as the duration of time that any one or more discrete segments of the exhaust flow 22 is/are resident within the substrate 40 of the oxidation catalyst 36 from engagement and ingress into the front face 42 inflow surface to egress from the substrate 40 out of the rear face 44 outflow surface. The front face 42 of the substrate 40 of the oxidation catalyst 36 can be positioned directly and fluidly adjacent to the exhaust passageway 18 such that the exhaust flow 22 flowing out of the exhaust passageway 18 engages and flows into the front face 42 of the substrate 40 of the oxidation catalyst 36. As a result, the oxidation catalyst 36, if included as a treatment device 24 of the aftertreatment system 20, thus represents the first, or upstream-most treatment device 24, and as the exhaust flow 22 is resident within and fluidly engages the substrate 40 of the oxidation catalyst 36, the substrate 40 may catalyze a chemical reaction to alter a composition of the $NO_X$ in the exhaust flow 22 such that a concentration of NO to $NO_2$ in the exhaust flow 22 exiting out of the rear face 44 of the substrate 40 of the oxidation catalyst 36 is about 1:1. In one example, the oxidation catalyst 36 may have a uniformly reduced diameter or width 46 throughout the length of the oxidation catalyst 36 from its front face 42 to its rear face 44 such that the oxidation catalyst 36 may have a compact cross sectional profile within the aftertreatment system 20. Additionally, in one embodiment, substrate 40 can be a low differential pressure, flow through substrate which in one example, is metallic, or alternatively, can be of any other suitable material, such as ceramic, which provides for the exhaust flow 22 therethrough at a low differential pressure.

The aftertreatment system 20 can also include an injector 48 which can include the injector nozzle 38 for introducing a reductant 50 into the exhaust flow 22. While other reductants 50 are possible, urea or a water/urea solution are the most commonly utilized reductants 50. In one embodiment, the injector nozzle 38 is positioned to introduce reductant 50 into the exhaust flow 22 upstream of the one or more hydrolysis catalysts 28 and the one or more exhaust constituent/$NO_X$ reduction treatment devices 26, which may include a combined particulate collection and reduction device 30 and a reduction device 32. Additionally, in an embodiment wherein an oxidation catalyst 36 is included, the injector nozzle 38 can be fluidly positioned downstream of and fluidly adjacent to the rear face 44 of the oxidation catalyst 36 such that the injector nozzle 38 introduces reductant 50 into the exhaust flow 22 after the exhaust flow 22 is fluidly directed out of the rear face 44 of the oxidation catalyst 36. The injector 48 and/or the injector nozzle 38 may include springs, washers, cooling passages, injector pins, and other features not shown. A reductant source 52 including a supply of reductant 50 can also be provided and can fluidly communicate reductant 50 to the injector 48. In one embodiment, the reductant source 52 can include a pressurized supply of reductant 50 wherein reductant 50 is drawn from the reductant source 52 and delivered to the injector 48 such that the reductant 50 may be selectively injected, sprayed or otherwise introduced into the exhaust flow 22 via the injector nozzle 38 to help promote $NO_X$ reduction within the exhaust constituent/$NO_X$ reduction treatment devices 26. In certain embodiments, in addition to the injector 48, injector nozzle 38, and reductant source 52, additional components including but not limited to a pump, a valve, a controller or injection control device and a sensor or sensors and other features not shown may be included and operably connected to the injector 48, injector nozzle 38, and/or reductant source 52 in order to control the delivery of reductant 50 into the exhaust flow 22. Furthermore, the foregoing may be components of and operate as an air-assisted urea injection system, an airless urea injection system, or any other system capable of introducing reductant 50 into the exhaust flow 22.

The aftertreatment system 20 can also include one or more hydrolysis catalysts 28 which are fluidly positioned to engage and condition the exhaust flow 22 directed through the aftertreatment system 20. In one embodiment, a first hydrolysis catalyst 54 is fluidly positioned to engage and condition the exhaust flow 22 within the aftertreatment system 20 downstream of the injector or nozzle 38 and downstream of a second of the one or more hydrolysis catalysts 28, if provided, and additionally is positioned upstream of one or more exhaust constituent/$NO_X$ reduction treatment devices 26. In one example, the first hydrolysis catalyst 54 includes a substrate 56 upon which the reductant 50 can react and can be decomposed or converted into $NH_3$ as the reductant 50 entrained within the exhaust flow 22 flows through the first hydrolysis catalyst 54. The substrate 56 of the first hydrolysis catalyst 54 can have a front face 58 which represents an exhaust flow 22 inflow surface and a rear face 60 which represents an exhaust flow 22 outflow surface of the substrate 56 wherein the residence time of the exhaust flow 22 inside the substrate 56 may be defined as the duration of time that any one or more discrete segments of the exhaust flow 22 is/are resident within the substrate 56 from engagement and ingress into the front face 58 inflow surface to egress out of the first hydrolysis catalyst 54 via the rear face 60 outflow surface. The front face 58 of the substrate 56 of the first hydrolysis catalyst 54 can face the injector nozzle 38 and/or can be positioned in direct, fluidly adjacent proximity to the introduction of reductant 50 into the exhaust flow 22 such that the reductant 50 entrained exhaust flow 22 is fluidly directed into the substrate 56 of the first hydrolysis catalyst 54 which promotes generation of ammonia ($NH_3$) from the reductant 50, which in one embodiment is composed of a urea or a water/urea solution. As a result, as the exhaust flow 22 is resident within and fluidly engages the substrate 56 of the first hydrolysis catalyst 54, the exhaust flow 22 having the reductant 50 entrained within, mixes within and fluidly engages or otherwise reacts upon the substrate 56 such that the reductant 50 within the exhaust flow 22 is decomposed or converted into $NH_3$ upon exiting out of the rear face 60 of the substrate 56 of the first hydrolysis catalyst 54. In one embodiment, the rear face 60 outflow surface of the substrate 56 of the first hydrolysis catalyst 54 can be positioned directly adjacent to and/or in fluidly adjacent proximity with a first or upstream end of an exhaust conduit, as discussed in further detail below. In an embodiment wherein only a first hydrolysis catalyst 54 is provided in the aftertreatment system 20, the front face 58 inflow surface of the substrate 56 can face the injector nozzle 38 and can be positioned in direct, fluidly adjacent proximity to the introduction of reductant 50 into the exhaust flow 22. Alternatively, in an embodiment wherein a second hydrolysis catalyst 62 is provided, the front face 58 of the substrate 56 of the first hydrolysis catalyst 54 can face and/or can be positioned in direct, fluidly adjacent proximity to a rear face 68 of a second hydrolysis catalyst 62, as provided herein.

In another embodiment, the aftertreatment system 20 can include a second hydrolysis catalyst 62 fluidly positioned to engage and condition the exhaust flow 22 within the aftertreatment system 20 upstream of the first hydrolysis catalyst 54, and upstream of one or more exhaust constituent/$NO_X$ reduction treatment devices 26. Consistent with the first hydrolysis catalyst 54 as provided above, the second hydrolysis catalyst 62 can include a substrate 64 upon which the reductant 50 reacts and is decomposed or converted into $NH_3$ as the reductant 50 entrained within the exhaust flow 22 flows through and is resident within the substrate 64 from engagement and ingress into a front face 66 inflow surface of the substrate 64 to egress out of the substrate 64 via a rear face 68 outflow surface. In an embodiment wherein a second hydrolysis catalyst 62 is provided, the front face 66 inflow surface of the substrate 64 of the second hydrolysis catalyst 62 can face the injector nozzle 38 and can be positioned in direct, fluidly adjacent proximity to the introduction of reductant 50 into the exhaust flow 22, and the front face 58 inflow surface of the substrate 56 of the first hydrolysis catalyst 54 can be facing and/or positioned in fluidly adjacent proximity downstream of the rear face 68 outflow surface of the second hydrolysis catalyst 62. As a result, in one example of the present embodiment, after being fluidly directed through the second hydrolysis catalyst 62, the exhaust flow 22 exiting the rear face 68 thereof can be fluidly directed to pass through the substrate 56 of the first hydrolysis catalyst 54, wherein the additional first hydrolysis catalyst 54 can perform additional mixing of the exhaust flow 22 and further decomposition or conversion of any additional or remaining reductant 50 into $NH_3$ provided within the exhaust flow 22.

In one embodiment, the one or more hydrolysis catalysts 28 may have a compact package size within the aftertreatment system 20. In one example, each of the first hydrolysis catalyst 54 and the second hydrolysis catalyst 62, if provided, may have a uniformly reduced diameter or width 70 throughout the individual lengths of each one of the one or more hydrolysis catalysts 28 extending from each respective front face 58, 66, to each respective rear face 60, 68, of each hydrolysis catalyst 54, 62, respectively, such that each of the one or more hydrolysis catalysts 28 have a compact cross sectional profile within the aftertreatment system 20. Furthermore, in one example, each of the substrates, such as substrates 56, 64 of the one or more hydrolysis catalysts 28 can be metallic with one or more sinuous channels such that turbulence is created within the exhaust flow 22 as the exhaust flow 22 is directed through each of the one or more hydrolysis catalysts 28.

The aftertreatment system 20 also includes one or more exhaust constituent/$NO_X$ reduction treatment devices 26 which can be positioned downstream of the one or more hydrolysis catalysts 28. In one embodiment, the aftertreatment system 20 includes a first exhaust constituent/$NO_X$ reduction treatment device 26 which in one example is a combined particulate collection and reduction device 30 that is fluidly positioned to engage and condition the exhaust flow 22 downstream of the one or more hydrolysis catalysts 28 and upstream of a second exhaust constituent/$NO_X$ reduction treatment device 26. In one example, the combined particulate collection and reduction device 30 is a combined diesel particulate filter (DPF) and SCR catalyst 30, or SCRF catalyst 30, and includes a combined filtration and reduction substrate 72. As such, the combined filtration and reduction substrate 72 of the SCRF catalyst 30 can be configured to perform particulate trapping functions as well as SCR functions. In particular, the combined filtration and reduction substrate 72 of the SCRF catalyst 30 can include filtration media configured to remove particulate matter (PM) and/or soot from the exhaust flow 22. In one embodiment, the filtration media of the combined filtration and reduction substrate 72 may embody a generally cylindrical deep-bed type of filtration media configured to accumulate PM and/or soot throughout a thickness thereof in a substantially homogenous manner. The filtration media may include a low density material and may be formed through a sintering process from metallic or ceramic particles. It is contemplated that the filtration media of the combined filtration and reduction substrate 72 may alternatively embody a surface type of filtration media fabricated from ceramic foam, a wire mesh, or any other suitable material.

Furthermore, the filtration media and/or surfaces of the combined filtration and reduction substrate 72 can also be catalyzed to promote reduction of an exhaust constituent of the exhaust flow 22 such as $NO_X$. In one example, the combined filtration and reduction substrate 72 is wash coated with an SCR type catalyst material, for example, a zeolite with an active base metal formulation such as copper. Alternatively, the filtration media and/or surfaces of the combined filtration and reduction substrate 72 may be wash coated or otherwise impregnated with another type of SCR type catalyst material. Other types of SCR type catalyst material include but are not limited to ceramic materials such as titanium oxide; a base metal oxide such as vanadium and tungsten; and/or zeolites. The combined filtration and reduction substrate 72 of the SCRF catalyst 30 can have a front face 74 which represents an exhaust flow 22 inflow surface and a rear face 76 which represents an exhaust flow 22 outflow surface of the combined filtration and reduction substrate 72 wherein the residence time of the exhaust flow 22 inside the combined filtration and reduction substrate 72 may be defined as the duration of time that any one or more discrete segments of the exhaust flow 22 is/are resident within the combined filtration and reduction substrate 72 from engagement and ingress into the front face 74 inflow surface to egress out of the substrate 72 of the SCRF catalyst 30 via the rear face 76 outflow surface. Additionally, in one embodiment, the front face 74 of the combined filtration and reduction substrate 72 of the SCRF catalyst 30 is positioned downstream of and directly adjacent and/or in fluidly adjacent proximity to a second or downstream end of an interior mixing volume of an exhaust conduit, as discussed in further detail below, to face and receive the exhaust flow 22 flowing out of the rear face 60 of the substrate 56 of the first hydrolysis catalyst 54 such that the exhaust flow 22, containing a uniform distribution of completely and/or substantially decomposed reductant 50 entrained therein, is evenly distributed and presented throughout the inflow surface area of the front face 74 of the combined filtration and reduction substrate 72 of the SCRF catalyst 30. Additionally, the rear face 76 of the combined filtration and reduction substrate 72 of the SCRF catalyst 30 can be facing and positioned directly and fluidly adjacent to the second exhaust constituent/$NO_X$ reduction treatment device 26, which can be a reduction device 32.

In one embodiment, the combined filtration and reduction substrate 72 is wash coated or otherwise impregnated with a first amount of SCR type catalyst material. In one example, the combined filtration and reduction substrate 72 can be a particulate collection device, which in one example is a low differential pressure, wall-flow DPF which is catalyzed to promote $NO_X$ reduction in the presence of reductant 50. In particular, the combined filtration and reduction substrate 72 can be a low differential pressure, wall-flow DPF which is wash coated with a first amount of the SCR type catalyst material to form a plurality of SCR type catalyst material reaction sites throughout the combined filtration and reduction substrate 72 such that a substantially equivalent first amount of $NH_3$ is absorbed throughout the combined filtration and reduction substrate 72 as the exhaust flow 22 flows through the substrate 72. In the present example, with this composition, as the exhaust flow 22 is resident within and fluidly engages the combined filtration and reduction substrate 72 of the SCRF catalyst 30, at least a portion or a first amount of the reductant 50 decomposed or otherwise converted into $NH_3$ by the one or more upstream hydrolysis catalysts 28 and entrained within the exhaust flow 22 may be absorbed onto the surface of and/or within the filtration media of the combined filtration and reduction substrate 72 at the SCR type catalyst material reduction sites, where a substantially equivalent portion or first amount of the $NO_X$ (catalyzed to an approximately 1:1 concentration of NO to $NO_2$ by the upstream oxidation catalyst 36, if provided) in the exhaust flow 22 reacts to form water ($H_2O$) and diatomic nitrogen ($N_2$), before flowing out of the substrate 72 of the SCRF catalyst 30 via the rear face 76 outflow surface. In one embodiment, the SCRF catalyst 30 may have an increased package size with a uniformly increased diameter or width 78 throughout the length of the SCRF catalyst 30 extending from its front face 74 to its rear face 76 such that the SCRF catalyst 30 may have a larger cross sectional profile within the aftertreatment system 20. Additionally, in one example, the diameter or width 78 of the SCRF catalyst 30 can be greater than diameters or widths 70 of each of the one or more hydrolysis catalysts 28, and additionally, or alternatively, can be greater than the diameter or width 46 of the oxidation catalyst 36, if included.

As provided above, the aftertreatment system 20 also can also include a second exhaust constituent/$NO_X$ reduction treatment device 26, which in one embodiment is a reduction device 32. In one example, the reduction device 32 is a selective catalytic reduction (SCR) catalyst 32, or SCR catalyst 32, having a substrate 80 which is catalyzed to promote reduction of an exhaust constituent of the exhaust flow 22 such as $NO_X$ in the presence of reductant 50. Substrate 80 may be a flow-through substrate fabricated from an electrically conductive or non-conductive coarse mesh metal or porous ceramic honeycomb medium, extruded or wash coated (or otherwise impregnated) with an SCR type catalyst material, for example, a zeolite with an active base metal formulation such as copper. Alternatively, the catalyzed substrate 80 of the SCR catalyst 32 may be extruded or wash coated with an alternative type of SCR type catalyst, for example, a ceramic material such as titanium oxide; a base metal oxide such as vanadium and tungsten; and/or zeolites. Similar to the substrate 72 of the SCRF catalyst 30 as provided above, the catalyzed substrate 80 of the SCR catalyst 32 can have a front face 82 exhaust flow 22 inflow surface and a rear face 84 exhaust flow 22 outflow surface, wherein an exhaust flow 22 residence time can be defined as the duration of time from exhaust flow 22 engagement and ingress into the front face 82 inflow surface to exhaust flow 22 egress out of the rear face 84 outflow surface of the substrate 80. In one embodiment, the front face 82 of the catalyzed substrate 80 of the SCR catalyst 32 can be facing and/or positioned in direct, fluidly adjacent proximity with the rear face 76 of the substrate 72 of the SCRF catalyst 30 such that the substrate 80 of the SCR catalyst 32 is fluidly positioned to receive exhaust flow 22 from the SCRF catalyst 30 and further reduce constituents of the exhaust such as $NO_X$. Additionally, the rear face 84 of the catalyzed substrate 80 of the SCR catalyst 32 can be facing and/or positioned in direct, fluidly adjacent proximity with the $AMO_X$ catalyst 34, if provided, or alternatively can be positioned adjacent to the downstream end of the aftertreatment system 20, as discussed herein.

In one example, the substrate 80 is a flow-through substrate extruded or wash coated (or otherwise impregnated) with a second amount of the SCR type catalyst material to form a plurality of SCR reaction sites throughout the substrate 80 such that a substantially equivalent second amount of the remaining $NH_3$ can be absorbed throughout the substrate 80 as the exhaust flow 22 is resident within and fluidly engages the substrate 80 of the SCR catalyst 32 from ingress into the front face 82 inflow surface to egress out of the rear face 84 outflow surface. As a result, in the present example, with the catalyzed flow-through substrate 80 extruded or wash coated (or otherwise impregnated) with the second amount of SCR type catalyst material, a second portion of decomposed or otherwise $NH_3$-converted reductant 50 remaining in the exhaust flow 22 flowing out of the rear face 76 of the SCRF catalyst 30 which was not absorbed by the SCR catalyst reduction sites within the combined filtration and reduction substrate 72 can be absorbed by the SCR catalyst reduction sites throughout the flow-through substrate 80, where the absorbed, $NH_3$-converted reductant 50 may react with a substantially equivalent portion or amount of the $NO_X$ remaining in the exhaust flow 22 to form water ($H_2O$) and diatomic nitrogen ($N_2$) as the exhaust flow 22 is resident within and fluidly engages the substrate 80.

In one embodiment, the SCR catalyst 32 may have an increased package size with an increased diameter or width 86 throughout the length of the SCR catalyst 32 which extends from its front face 82 to its rear face 84 such that the SCR catalyst 32 may have a larger cross sectional profile within the aftertreatment system 20. In one example, diameter or width 86 of the SCR catalyst 32 can be greater than diameters or widths 70 of each of the one or more hydrolysis catalysts 28, and additionally, or alternatively, can be greater than the diameter or width 46 of the oxidation catalyst 36, if included.

In one embodiment, the first amount of SCR type catalyst material loaded onto the combined filtration and reduction substrate 72 of the SCRF catalyst 30 may be equal to the second amount of SCR type catalyst material loaded onto the substrate 80 of the SCR catalyst 32. Alternatively, the SCR catalyst 32 may be configured to reduce a different, second amount of $NO_X$ entrained within the exhaust flow 22 as compared to the SCRF catalyst 30, and the SCR type catalyst material loading on the substrate 80 of the SCR catalyst 32 may be different than that of the combined filtration and reduction substrate 72 of the SCRF catalyst 30. In one example, the first amount of SCR type catalyst material loaded on the combined filtration and reduction substrate 72 of the SCRF catalyst 30 may be between 0.95 $g/in^3$-2.5 $g/in^3$ and the second amount of SCR type catalyst material loaded on the substrate 80 of the SCR catalyst 32 may be between 1.5 $g/in^3$-2.5 $g/in^3$. However, additional amounts and distributions of SCR type catalyst material loadings between the combined filtration and reduction substrate 72 of the SCRF catalyst 30 and the substrate 80 of the SCRF catalyst 30 are contemplated without departing from the scope of the present disclosure.

Additionally, it is contemplated that the composition of the SCR type catalyst material on the substrate 80 of the SCR catalyst 32 may be different than the composition of the SCR type catalyst material on the combined filtration and reduction substrate 72 of the SCRF catalyst 30 to accommodate downstream exhaust flow 22 conditions that are different from upstream exhaust flow 22 conditions, including but not limited to one or numerous variations of the characteristics of the exhaust flow 22 such as variations in upstream and downstream exhaust temperatures, exhaust flow 22 flow density, velocity, and the like. For example, substrate 80 may be coated with an SCR type catalyst material having a lower activation temperature than that applied to upstream-located combined filtration and reduction substrate 72.

Substrates 72 and 80 may receive all reductant 50 introduced into the exhaust flow 22 via the injector nozzle 38. That is, the injector nozzle 38 may introduce reductant 50 into the exhaust flow 22 upstream of the one or more hydrolysis catalysts 28 which in turn convert the reductant 50 into $NH_3$ upstream of the SCRF catalyst 30 and SCR catalyst 32, and the combined filtration and reduction substrate 72 of the SCRF catalyst 30 may consume the first amount of the $NH_3$ entrained in the exhaust flow 22 wherein the entirety of the residual, or otherwise un-consumed second amount of $NH_3$ passing through the combined filtration and reduction substrate 72 may be consumed by the substrate 80 of the downstream SCR catalyst 32. No other source of reductant 50 and converted $NH_3$ may be available within power system 10. In one embodiment an amount of reductant 50 (subsequently converted $NH_3$) in excess of that expected to be absorbed by and consumed via the $NO_X$ reduction within the SCRF catalyst 30 can be provided to help insure that at least some $NH_3$ remains in the exhaust flow 22 entering the SCR catalyst 32.

During operation of power system 10, it may be possible for too much $NH_3$ to be advanced into the exhaust flow 22 (i.e., $NH_3$ in excess of that required for appropriate $NO_X$ reduction). In this situation, known as "ammonia slip", some amount of ammonia may pass through substrates 72 and 80 to the atmosphere, if not otherwise accounted for. To help minimize the magnitude of ammonia slip, an ammonia oxidation ($AMO_X$) catalyst 34 may be located downstream of the SCR catalyst 32. $AMO_X$ catalyst 34 may include a substrate 88 coated with a catalyst that oxidizes residual $NH_3$ in the exhaust flow 22. In one embodiment, the $AMO_X$ catalyst 34 can be provided in a separate brick downstream of the SCR catalyst 32, wherein the substrate 88 of $AMO_X$ catalyst 34 can have a front face 90 facing and/or positioned in direct, fluidly adjacent proximity with the rear face 84 of the catalyzed substrate 80 of the SCR catalyst 32, and a rear face 92 facing and/or positioned in direct, fluidly adjacent proximity with the downstream end of the aftertreatment system 20, discussed below. Alternatively, the $AMO_X$ catalyst 34 can be integrated into or zone coated on the SCR brick of the SCR catalyst 32. In yet another alternative, it is contemplated that the $AMO_X$ catalyst 34 may be omitted, if desired. In one embodiment, the $AMO_X$ catalyst 34 may have an increased package size with a uniformly increased diameter or width 94 throughout the length of $AMO_X$ catalyst 34 which extends from its front face 90 to its rear face 92 (which may be greater than diameters or widths 70 of each of the one or more hydrolysis catalysts 28, and additionally, or alternatively, can be greater than the diameter or width 46 of the oxidation catalyst 36, if included) such that the $AMO_X$ catalyst 34 has a larger cross sectional profile within the aftertreatment system 20.

The aftertreatment system 20 may include one or more canisters each of which housing any one or more of the treatment devices 24, 26 and directing the exhaust flow 22 through the treatment devices 24, 26 to condition the exhaust flow 22 before the exhaust flow 22 is directed to the atmosphere. In one embodiment, the oxidation catalyst 36 (if provided), the one or more hydrolysis catalysts 28, the SCRF catalyst 30, the SCR catalyst 32, and optionally, the $AMO_X$ catalyst 34 can be housed in separate canisters. Alternatively, the treatment devices can be housed in common canisters.

An exhaust conduit 96 can extend between the downstream one of the one or more hydrolysis catalysts 28 and the SCRF catalyst 30. In one embodiment, the exhaust conduit 96 extends from a first or upstream end 98 to a second or downstream end 100, wherein in one embodiment, the first or upstream end 98 represents an exhaust flow 22 inflow end of an interior mixing volume 102 of the exhaust conduit 96 and the second or downstream end 100 represents an exhaust flow 22 outflow end of the interior mixing volume 102 of the exhaust conduit 96. In one example, the interior mixing volume 102 of the exhaust conduit 96 can be defined as an interior space within the exhaust conduit 96 within which the exhaust flow 22 may mix, flow, or otherwise be fluidly contained throughout the internal axial or longitudinal length 104 of the exhaust conduit 96 from the first or upstream end 98 to the second or downstream end 100. As such, the internal axial or longitudinal length 104 of the exhaust conduit 96 can be defined as the axial or longitudinal distance from the first or upstream end 98 to the second or downstream end 100 of the interior mixing volume 102 of the exhaust conduit 96. The residence time of the exhaust flow 22 within the internal or interior space or volume of the exhaust conduit 96, and accordingly, within the interior mixing volume 102, can be defined by the duration of time that any one or more discrete segments of the exhaust flow 22 is/are resident within the interior cross-sectional area of the exhaust conduit 96 extending along and/or throughout the internal axial or longitudinal length 104 of the exhaust conduit 96 from engagement and fluid ingress into the first or upstream end 98 of the interior mixing volume 102 of the exhaust conduit 96 to fluid egress from the second or downstream end 100 of the interior mixing volume 102 of the exhaust conduit 96. In one embodiment, interior mixing volume 102 of the exhaust conduit 96 fluidly communicates or routes the exhaust flow 22 from the rear face (such as 60) of the downstream most one of the one or more hydrolysis catalysts 28 to the front face 74 of the SCRF catalyst 30. In one example, the first or upstream end 98 of the interior mixing volume 102 of the exhaust conduit 96 can be positioned directly adjacent to and/or in direct fluidly adjacent proximity with the rear face 60 of the substrate 56 of the first hydrolysis catalyst 54, such that exhaust flow 22 flowing out of the rear face (such as 60) of the downstream-most one of the one or more hydrolysis catalysts 28 is fluidly directed into the first or upstream end 98 of the interior mixing volume 102 of the exhaust conduit 96. Additionally, in the present embodiment, the second or downstream end 100 of the exhaust conduit 96 can be positioned directly adjacent to and/or in direct fluidly adjacent proximity with the front face 74 of the combined filtration and reduction substrate 72 of the SCRF catalyst 30 such that exhaust flow 22 flowing out of the second or downstream end 100 of the interior mixing volume 102 of the exhaust conduit 96 is fluidly directed to engage and enter the front face 74 of the combined filtration and reduction substrate 72 of the SCRF catalyst 30. As provided herein, the interior mixing volume 102, and accordingly the residence time of the exhaust flow 22 within the exhaust conduit 96 of the present aftertreatment system 20 is reduced, such that the exhaust constituent/$NO_X$ reduction treatment devices 26 are positioned at an increased thermal and fluid proximity to the upstream end of the aftertreatment system 20.

Figure 2:
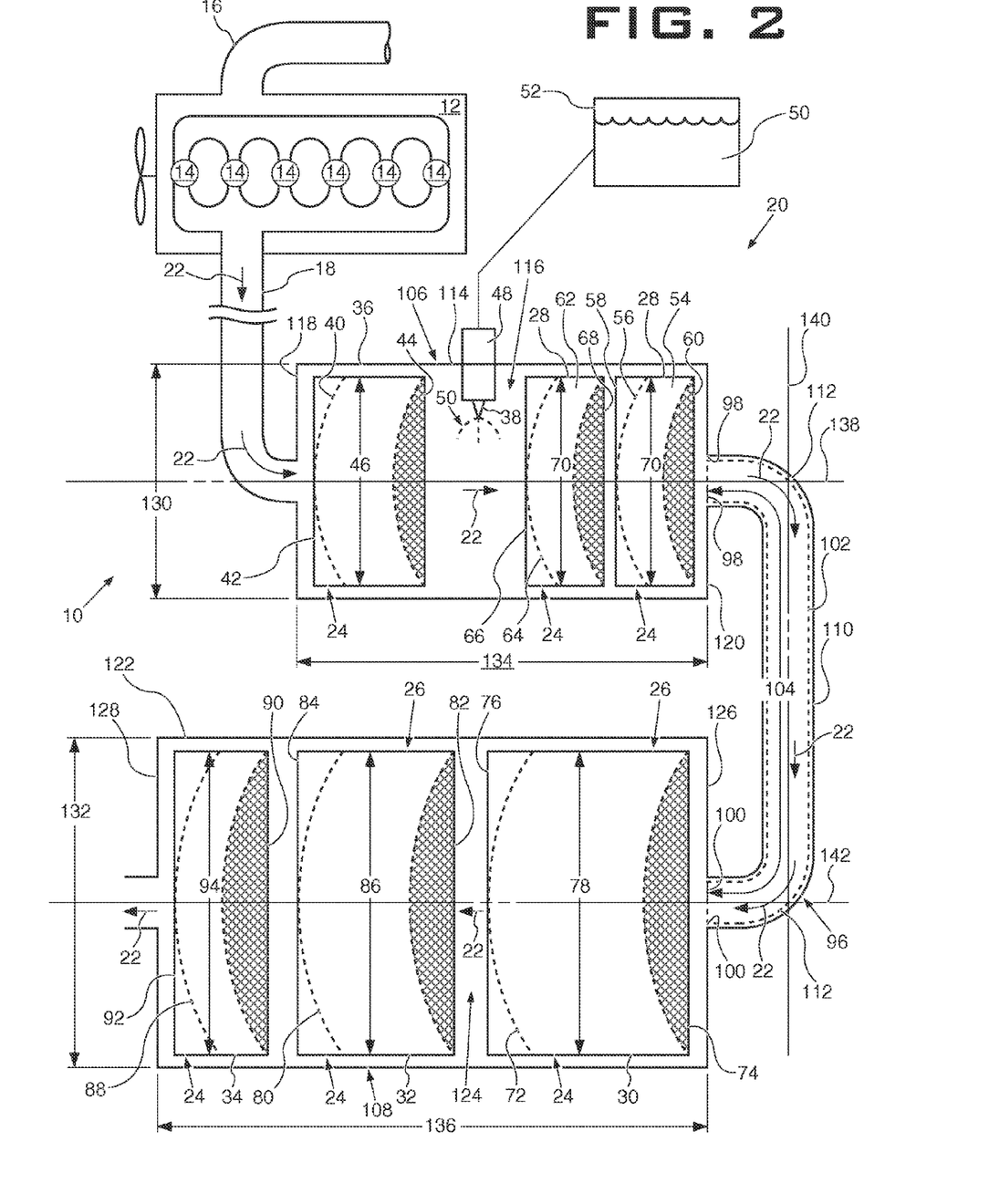
FIG. 2 is a schematic view and diagrammatic illustration of a second exemplary embodiment of the disclosed exhaust aftertreatment system.

In one embodiment, the aftertreatment system 20 includes a first canister 106. In one example, the first canister 106 can house the oxidation catalyst 36, if included, can include the injector nozzle 38 extending therein or otherwise positioned to introduce reductant 50 into the exhaust flow 22 flowing through the first canister 106, and additionally can house each of the one or more hydrolysis catalysts 28. In the presently discussed embodiment, the aftertreatment system 20 can also include a second canister 108 which houses the combined particulate collection and reduction device 30, which can be an SCRF catalyst 30, the reduction device 32, which can be an SCR catalyst 32, and optionally the $AMO_X$ catalyst 34, if provided. The first canister 106 and second canister 108 may be fabricated from a material provided with corrosion protection, for example, stainless steel. Additionally, in one embodiment, the exhaust conduit 96 can be connected to each of and extend between the first canister 106 and second canister 108 such that the first canister 106 is connected in fluid communication with the second canister 108 via the exhaust conduit 96. Additionally, in one embodiment as shown in FIG. 1, the exhaust conduit 96 can include an external conduit body 110 which extends from the first canister 106 to the second canister 108 and defines the internal mixing volume 102 within the exhaust conduit 96. In an alternative exemplary embodiment as illustrated in FIG. 2, the external conduit body 110 of exhaust conduit 96 connects at either end to the first canister 106 and second canister 108 via couplings 112 which may embody cobra-head type couplings, wherein the internal space or volume within each of the couplings 112 in addition to that within the external conduit body 110 combine to define the internal mixing volume 102 within the exhaust conduit 96.

The first canister 106 can include an enclosed outer housing 114 having at least one hollow interior chamber 116. In one embodiment, the enclosed outer housing 114 of the first canister 106 may be cylindrical or alternatively rectangular and may include at least one longitudinal side wall enclosed by end walls to define the hollow interior chamber 116 therein. In one embodiment, the exhaust flow 22 is fluidly communicated into the hollow interior chamber 116 at an upstream end 118 of the first canister 106 and exhaust flow 22 is fluidly communicated out of the hollow interior chamber 116 at a downstream end 120 of the first canister 106, wherein, in one example, the upstream end 118 can be at an end of the first canister 106 opposite of that of the downstream end 120. In one embodiment, the upstream end 118 of the first canister 106 can be connected in fluid communication with the exhaust passageway 18 such that the exhaust flow 22 from the exhaust passageway 18 is fluidly directed to enter the hollow interior chamber 116 at the upstream end 118 of the first canister 106. As such, the upstream end 118 of the first canister 106 can also represent the upstream end 118 of the aftertreatment system 20. Additionally, the downstream end 120 of the first canister 106 can be connected in fluid communication with the first or upstream end 98 of the interior mixing volume 102 of the exhaust conduit 96 such that the exhaust flow 22 flowing out of the interior chamber 116 at the downstream end 120 of the first canister 106 is routed into the upstream end 98 and directed to fluidly flow through the interior mixing volume 102 throughout the internal length 104 of exhaust conduit 96 to the second canister 108.

The oxidation catalyst 36, if provided, the injector nozzle 38, and each of the one or more hydrolysis catalysts 28 can be housed (or otherwise positioned) within the hollow interior chamber 116 of the first canister 106 such that these components are sequentially and spatially arranged or positioned within the hollow interior chamber 116 with respect to the exhaust passageway 18, the upstream end 118 the first canister 106, the downstream end 120 of the first canister 106, the first or upstream end 98 of the exhaust conduit 96 and a path of the exhaust flow 22 flowing through the first canister 106 from its upstream end 118 to the downstream end 120.

In embodiments which include an oxidation catalyst 36, the front face 42 of the substrate 40 of the oxidation catalyst 36 can be positioned directly adjacent to and/or facing the upstream end 118 of the first canister 106 and additionally can be in direct fluid proximity and communication with the exhaust passageway 18 such that the exhaust flow 22 flowing out of the exhaust passageway 18 engages and flows into the front face 42 of the substrate 40 and the oxidation catalyst 36. The rear face 44 of the substrate 40 of the oxidation catalyst 36 can face and/or can be positioned within the hollow interior chamber 116 of the first canister 106 in direct, fluidly adjacent proximity and communication upstream of the injector nozzle 38 of the injector 48. As a result, if included, the oxidation catalyst 36 can be positioned as a first, or an upstream-most treatment device 24 within the hollow interior chamber 116 directly adjacent to the upstream end 118 of the first canister 106. The injector nozzle 38 of the injector 48, in one example, can be mounted to extend into the hollow interior chamber 116 of the first canister 106, and/or otherwise positioned to inject reductant 50 into the exhaust flow 22 flowing through the hollow interior chamber 116 of the first canister 106 upstream of the one or more hydrolysis catalysts 28 and downstream of the oxidation catalyst 36, if provided.

In an embodiment wherein only a first hydrolysis catalyst 54 is provided in the aftertreatment system 20 and housed within the hollow interior chamber 116 of the first canister 106, the front face 58 inflow surface of the substrate 56 of the first hydrolysis catalyst 54 can be positioned to face and/or can be positioned in direct, fluidly adjacent proximity downstream of the injector nozzle 38 of the injector 48 such that the front face 58 of the first hydrolysis catalyst 54 directly receives the reductant 50 entrained exhaust flow 22 flowing past the injector nozzle 38. Additionally, the rear face 60 outflow surface of the substrate 56 of the first hydrolysis catalyst 54 can be positioned within the first canister 106 directly adjacent to and/or facing the downstream end 120 of the first canister 106, and additionally can be adjacent to and in direct fluid proximity and communication with the first or upstream end 98 of the internal mixing volume 102 of the exhaust conduit 96. Alternatively, in an embodiment wherein a second hydrolysis catalyst 62 is provided and housed within the hollow interior chamber 116 of the first canister 106, the second hydrolysis catalyst 62 can be positioned upstream of the first hydrolysis catalyst 54, wherein in one example, the front face 66 inflow surface of the substrate 64 of the second hydrolysis catalyst 62 can be positioned to face and/or can be positioned in direct, fluidly adjacent proximity downstream of the injector nozzle 38 of the injector 48 such that the front face 58 of the second hydrolysis catalyst 62 directly receives the reductant 50 entrained exhaust flow 22 flowing past the injector nozzle 38. Additionally, the rear face 68 outflow surface of the substrate 64 of the second hydrolysis catalyst 62 can be upstream of and facing and/or positioned directly and fluidly adjacent to the front face 58 inflow surface of the substrate 56 of the first hydrolysis catalyst 54. Consistent with the foregoing embodiment, in an embodiment wherein a second hydrolysis catalyst 62 is provided upstream of the first hydrolysis catalyst 54, the rear face 60 outflow surface of the substrate 56 of the first hydrolysis catalyst 54 can be positioned within the first canister 106 directly adjacent to and/or facing the downstream end 120 of the first canister 106, and additionally can be adjacent to and in direct fluid proximity and communication with the first or upstream end 98 of the internal mixing volume 102 of the exhaust conduit 96. As a result, in one embodiment, the one or more hydrolysis catalysts 28 can be arranged or otherwise positioned as downstream-most treatment devices 24 within the hollow interior chamber 116 directly adjacent to the downstream end 120 of the first canister 106 such that reductant 50 decomposed or otherwise converted into $NH_3$ and entrained within the exhaust flow 22 flowing out of the one or more hydrolysis catalysts 28 is fluidly directed into first or upstream end 98 of the internal mixing volume 102 of the exhaust conduit 96.

The second canister 108 can include an enclosed outer housing 122 having at least one hollow interior chamber 124. In one embodiment, the enclosed outer housing 122 of the second canister 108 may be cylindrical or alternatively rectangular and may include at least one longitudinal side wall enclosed by end walls to define the hollow interior chamber 124 therein. In one embodiment, exhaust flow 22 is fluidly communicated into the hollow interior chamber 124 at an upstream end 126 of the second canister 108 and exhaust flow 22 is fluidly communicated out of the hollow interior chamber 124 at a downstream end 128 of the second canister 108, wherein in one example, the upstream end 126 can be at an end of the second canister 108 opposite of that of the downstream end 128. In one embodiment, the upstream end 126 of the second canister 108 can be connected in fluid communication with the second or downstream end 100 or outflow end of the interior mixing volume 102 of the exhaust conduit 96 such that the exhaust flow 22 flowing out of the second or downstream end 100 of the interior mixing volume 102 of the exhaust conduit 96 is fluidly directed to enter the hollow interior chamber 124 at the upstream end 126 of the second canister 108. Additionally, the downstream end 128 of the second canister 108 can be connected in fluid communication with an exhaust passageway such as exhaust passageway 18 such that the exhaust flow 22 flowing out of the interior chamber 124 of the second canister 108 is fluidly directed to exit the aftertreament system 20 at the downstream end 128 of the second canister 108. As such, the downstream end 128 of the second canister 108 can also represent the downstream end 128 of the aftertreatment system 20.

In one embodiment, the SCRF catalyst 30, SCR catalyst 32, and optionally the $AMO_X$ catalyst 34 can be housed within the hollow interior chamber 124 of the second canister 108 such that these components are sequentially and spatially arranged or positioned within the hollow interior chamber 124 with respect to the second or downstream end 100 of the exhaust conduit 96, the upstream end 126 of the second canister 108, the downstream end 128 of the second canister 108 and a path of the exhaust flow 22 flowing through the second canister 108 from its upstream end 126 to its downstream end 128. In one embodiment, the SCRF catalyst 30 is positioned within the hollow interior chamber 124 adjacent to the upstream end 126 of the second canister 108, upstream of the SCR catalyst 32, and upstream of the $AMO_X$ catalyst 34, if included. As a result, in one embodiment the SCRF catalyst 30 is positioned as the upstream-most treatment device 26 within the second canister 108 and thus is the first treatment device 26 to receive exhaust flow 22 leaving the one or more hydrolysis catalysts 28 and fluidly communicated to the second canister 108 via the length 104 of the exhaust conduit 96. In one example, the front face 74 of the combined filtration and reduction substrate 72 of the SCRF catalyst 30 can be positioned directly adjacent to and/or facing the upstream end 126 of the second canister 108 and additionally can be adjacent to and/or in direct fluid proximity and communication with the second or downstream end 100 of the interior mixing volume 102 of the exhaust conduit 96 such that exhaust flow 22 flowing out of the second or downstream end 100 of the interior mixing volume 102 of the exhaust conduit 96 is fluidly directed to engage and enter the front face 74 of the combined filtration and reduction substrate 72 of the SCRF catalyst 30. As a result, in one embodiment, exhaust conduit 96 and interior mixing volume 102 therein can be configured to fluidly communicate exhaust flow 22 from the one or more hydrolysis catalysts 28 to the front face 74 of the combined filtration and reduction substrate 72 of the SCRF catalyst 30 such that the exhaust flow 22, upon exiting the downstream end 100 of the exhaust conduit 96, contains a uniform mixture and distribution of completely and/or substantially decomposed reductant 50 (into $NH_3$) entrained therein which can be evenly distributed and presented throughout the inflow surface area of the front face 74 of the combined filtration and reduction substrate 72.

Additionally, the SCR catalyst 32 may be housed within the hollow interior chamber 124 downstream of the SCRF catalyst 30 and upstream of the $AMO_X$ catalyst 34, if included. In one example, the front face 82 of the substrate 80 of the SCR catalyst 32 can be facing and/or positioned directly adjacent in fluid proximity and communication with the rear face 76 of the combined filtration and reduction substrate 72 of the SCRF catalyst 30. In one embodiment, the rear face 84 of the catalyzed substrate 80 of the SCR catalyst 32 can be facing and/or positioned directly adjacent in fluid proximity and communication with the $AMO_X$ catalyst 34, which, if provided, may be housed the hollow interior chamber 124 adjacent to the downstream end 128 of the second canister 108. Alternatively, the rear face 84 of the catalyzed substrate 80 of the SCR catalyst 32, (or, if provided, the rear face 92 of the substrate 88 of the $AMO_X$ catalyst 34) can be facing and/or positioned directly adjacent in fluid proximity and communication with the downstream end 128 of the second canister 108 and additionally can be directly fluidly adjacent to an exhaust passageway such as exhaust passageway 18 which directs exhaust flow 22 out of the interior chamber 124 of the second canister 108.

In one embodiment, the first canister 106 is embodied as a compact unit having a smaller package size than that of the second canister 108. In particular, in one example, the first canister 106 can have a diameter or width 130 which is substantially defined by the uniform diameter or width 70 of each of the one or more hydrolysis catalysts 28, and optionally the diameter or width 46 of the oxidation catalyst 36. Furthermore, the second canister 108 can have a diameter or width 132 which is substantially defined by the diameter or width 78 of the SCRF catalyst 30 and/or the diameter or width 86 of the SCR catalyst 32, and as such, in one embodiment the diameter or width 130 of the first canister 106 can be smaller than the diameter or width 132 of the second canister 108. Alternatively, in other embodiments, the diameter or width 130 of the first canister 106 can be substantially equivalent to the diameter or width 132 of the second canister 108. Additionally, the enclosed outer housing 114 of the first canister 106 can have a length 134 which is substantially defined as the distance from the upstream end 118 to the downstream end 120 of the first canister 106; and similarly, the enclosed outer housing 122 of the second canister 108 can have an length 136 which is substantially defined as the distance from the upstream end 126 to the downstream end 128 of the second canister 108. In one embodiment, the length 134 of the first canister 106 can be less than the length 136 of the second canister 108. However, it is also contemplated that the length 134 of the first canister 106 can be substantially equivalent to the length 136 of the second canister 108.

As provided above, the interior mixing volume 102 of the exhaust conduit 96, and accordingly, the residence time of the exhaust flow 22 within the exhaust conduit 96 of the present aftertreatment system 20 can be reduced, wherein in one embodiment, the interior mixing volume 102 of the exhaust conduit 96 of the present aftertreatment system 20 can be reduced by between 25-50%. In one embodiment, the interior mixing volume 102 of the exhaust conduit 96, which can be defined in part by the interior cross-sectional area of the exhaust conduit 96 along the internal axial or longitudinal length 104 of the interior mixing volume 102 of the exhaust conduit 96, can extend directly, substantially linearly and straightly at a reduced length 104 from the first or upstream end 98 of the exhaust conduit 96 positioned directly adjacent to and/or in direct fluid proximity with the rear face (such as 60) of the downstream-most one of the one or more hydrolysis catalysts 28 to the second or downstream end 100 positioned directly adjacent to and in direct fluid proximity with the front face 74 of the combined filtration and reduction substrate 72 of the SCRF catalyst 30. In one exemplary embodiment, as shown in FIG. 1, the longitudinal axis 138 of the first canister 106, the longitudinal axis 140 of the body 110 of exhaust conduit 96, and the longitudinal axis 142 of the second canister 108 are linearly aligned, wherein the exhaust conduit 96 extends linearly and directly from the downstream end 120 of the first canister 106 adjacent the rear face (such as 60) of the downstream-most one of the one or more hydrolysis catalysts 28 to the upstream end 126 of the second canister 108 adjacent the front face 74 of the combined filtration and reduction substrate 72 of the SCRF catalyst 30, wherein downstream end 120 of the first canister 106 and the rear face (such as 60) of the downstream-most one of the one or more hydrolysis catalysts 28 are adjacently aligned with and face the upstream end 126 of the second canister 108 as well as the front face 74 of the combined filtration and reduction substrate 72 of the SCRF catalyst 30. In the present exemplary embodiment, the length 104 of the cross-sectional area of the exhaust conduit 96, and accordingly the length 104 of the interior mixing volume 102 from the first or upstream end 98 to the second or downstream end 100 of the exhaust conduit 96 is no greater than the length 134 of the first canister 106 and additionally, or alternatively, the length 136 of the second canister 108.

In an additional exemplary embodiment, as shown in FIG. 2, the longitudinal axis 138 of the first canister 106 is parallel to the longitudinal axis 142 of the second canister 108 such that the first canister 106 and the second canister 108 are arranged in side-by-side, axially parallel orientation. In one example of the present exemplary embodiment illustrated in FIG. 2, the axial position of the downstream end 120 of the first canister 106 and the axial position of the rear face 60 of the downstream-most one of the one or more hydrolysis catalysts 28 along the longitudinal axis 138 of the first canister 106 corresponds in parallel alignment, respectively, with the axial position of the upstream end 126 of the second canister 108 and the axial position of the front face 74 of the combined filtration and reduction substrate 72 of the SCRF catalyst 30 along the longitudinal axis 142 of the second canister 108, wherein in a particular example, the downstream end 120 of the first canister 106 and the rear face 60 of the downstream-most one of the one or more hydrolysis catalysts 28 can be coplanar with the upstream end 126 of the second canister 108 and the front face 74 of the substrate 72 of the SCRF catalyst 30. Additionally, in the presently discussed exemplary embodiment as shown in FIG. 2, the body 110 of exhaust conduit 96, as well as the interior mixing volume 102 disposed, in part, therein, can be substantially straight and can extend directly and substantially linearly from the downstream end 120 of the first canister 106 to the upstream end 126 of the second canister 108 along an axis 140 which is generally perpendicular to the longitudinal axis 138 of the first canister 106 and the longitudinal axis 142 of the second canister 108, wherein the length 104 of the interior mixing volume 102 of the exhaust conduit 96 from the first or upstream end 98 to the second or downstream end 100 is no greater than the length 134 of the first canister 106 and additionally, or alternatively, the length 136 of the second canister 108.

The foregoing configurations as shown in FIG. 1 and FIG. 2 represent exemplary illustrations, and additional configurations and orientations between the first canister 106, second canister 108, and the exhaust conduit 96 are contemplated by and fall within the scope of the present disclosure. Notwithstanding, in any embodiment, the first canister 106, the second canister 108, and exhaust conduit 96 can also be arranged, configured, and/or mounted in other ways which may reduce the interior mixing volume of the exhaust conduit 96 may be reduced by between 25-50%, and accordingly may reduce the residence time of the exhaust flow 22 within the exhaust conduit 96 of the present aftertreatment system 20 while presenting a uniform distribution of completely and/or substantially decomposed reductant 50 within the exhaust flow 22 to exhaust constituent/$NO_X$ reduction treatment devices 26 positioned at an increased thermal and fluid proximity to the upstream end of the aftertreatment system 20.

INDUSTRIAL APPLICABILITY

The power system 10 and aftertreatment system 20 included therein of the present disclosure may be applicable to any power system and/or engine configuration, and may provide, in part, reduced aftertreatment package sizing, increased emissions reduction and/or $NO_X$ conversion efficiency, reduced aftertreatment backpressure and increased fuel efficiency as well as a lower aftertreatment system cost. The disclosed aftertreatment system 20 may provide an increased effective amount of SCR type catalyst material as well as accommodate a larger quantity and more uniform dispersion of $NH_3$ in addition to more widespread $NO_X$ reaction sites. The disclosed aftertreatment system 20 may also improve the mixing, conversion, and atomization of the reductant 50 and $NH_3$. Operation of power system 10 will now be described.

Referring to FIG. 1, an air induction system may pressurize and force air or a mixture of air and fuel through an air or air/fuel passageway 16 into cylinders 14 of the engine block 12 of power system 10 for subsequent combustion. The fuel and air mixture may be combusted by power system 10 to produce a mechanical work output and an exhaust flow 22 of hot gases and byproducts of the combustion process. The exhaust flow 22 may contain a complex mixture of air pollutants, which can include particulate matter (PM) and/or soot, hydrocarbons, and gaseous compounds including, inter alia, the oxides of nitrogen ($NO_X$) included therein. The exhaust flow 22 may be routed from the cylinders 14 of the engine block 12 to the aftertreatment system 20 through the exhaust passageway 18.

As illustrated by the exemplary embodiments shown in FIG. 1 and FIG. 2, as the exhaust flow 22 enters the aftertreatment system 20, the exhaust flow 22 may first be directed into the hollow interior chamber 116 at the upstream end 118 of the first canister 106, which may include an oxidation catalyst 36. In embodiments wherein the oxidation catalyst 36 is included in the aftertreatment system 20, as the exhaust flow 22 flows through the substrate 40 of the oxidation catalyst 36, the oxidation catalyst 36 may catalyze a chemical reaction to alter a composition of the $NO_X$ in the exhaust flow 22 passing through oxidation catalyst 36 such that a concentration of NO to $NO_2$ in the exhaust flow 22 exiting the oxidation catalyst 36 is about 1:1.

The exhaust flow 22, upon being fluidly directed into the hollow interior chamber 116 at the upstream end 118 of the first canister 106 via the exhaust passageway 18 and through the oxidation catalyst 36, if present, may next be directed through the first canister 106 in fluid proximity to the injector nozzle 38 upstream of the one or more hydrolysis catalysts 28 such that reductant 50 is introduced into the exhaust flow 22. Following the introduction of reductant 50 into the exhaust flow 22, the exhaust flow 22 may be fluidly directed to pass through the one or more hydrolysis catalysts 28, which can include at least a first hydrolysis catalyst 54, and in one embodiment, optionally includes a second hydrolysis catalyst 62.

As the exhaust flow 22 is resident within and fluidly engages the substrate 56 of the first hydrolysis catalyst 54, the exhaust flow 22 having the reductant 50 entrained within, mixes within and fluidly engages or otherwise reacts upon the substrate 56 such that the reductant 50 is decomposed or converted into $NH_3$ within the exhaust flow 22 upon exiting the first hydrolysis catalyst 54. Additionally, before being fluidly directed through the first hydrolysis catalyst 54, the exhaust flow 22 can be fluidly directed to pass through the substrate 64 of the second hydrolysis catalyst 62 which, if provided, can perform additional mixing of the exhaust flow 22 and/or further decomposition or conversion of any additional or remaining reductant 50 into $NH_3$ provided within the exhaust flow 22.

The exhaust flow 22 flowing out of the rear face (such as 60) of the downstream-most one of the one or more hydrolysis catalysts 28 (such as first hydrolysis catalyst 54) and containing entrained reductant 50 decomposed or otherwise converted into $NH_3$ may next be fluidly directed from the downstream end 120 of the first canister 106 into first or upstream end 98 of the interior mixing volume 102 of the exhaust conduit 96. The exhaust flow 22 may next be fluidly routed through the interior mixing volume 102 of the exhaust conduit 96 such that the exhaust flow 22 may mix, flow, or otherwise be fluidly communicated throughout the axial or longitudinal length 104 of the interior mixing volume 102 of the exhaust conduit 96 from the first or upstream end 98 to the second or downstream end 100 of the exhaust conduit 96. Next, the exhaust flow 20 may be directed out of the second or downstream end 100 of the interior mixing volume 102 of the exhaust conduit 96 and into the hollow interior chamber 116 of the second canister 108 at the upstream end 126 thereof such that the exhaust flow 22 can engage and enter the front face 74 of the combined filtration and reduction substrate 72 of the SCRF catalyst 30.

As the exhaust flow 22 fluidly engages and/or passes through and is resident within the combined filtration and reduction substrate 72 of the SCRF catalyst 30, particulate matter (PM) and/or soot entrained within the exhaust flow 22 may be trapped, filtered, absorbed, or otherwise removed by the filtration media of the combined filtration and reduction substrate 72 of the SCRF catalyst 30. At the same time, at least a portion or a first amount of the reductant 50 decomposed or otherwise converted into $NH_3$ by the one or more upstream hydrolysis catalysts 28 and entrained within the exhaust flow 22 passing through the combined filtration and reduction substrate 72 may be absorbed by SCR type catalyst material reduction sites within the filtration media of the combined filtration and reduction substrate 72 where a substantially equivalent portion or first amount of the $NO_X$ (catalyzed to an approximately 1:1 concentration of NO to $NO_2$ by the upstream oxidation catalyst 36, if provided) in the exhaust flow 22 reacts to form water ($H_2O$) and diatomic nitrogen ($N_2$). Upon egress of the exhaust flow 22 out of the rear face 76 outflow surface of the SCRF catalyst 30, the exhaust flow 22 may next fluidly engage and be directed into the front face 82 inflow surface of the catalyzed substrate 80 of the SCR catalyst 32, wherein as the exhaust flow 22 is resident within the substrate 80 of the SCR catalyst 32, a second portion of decomposed or otherwise $NH_3$-converted reductant 50 remaining in the exhaust flow 22 can be absorbed by the SCR catalyst reduction sites throughout the flow-through substrate 80, where the remaining reductant 50 may react with a substantially equivalent portion or amount of the $NO_X$ remaining in the exhaust flow 22 to form water ($H_2O$) and diatomic nitrogen ($N_2$) as the exhaust flow 22 is resident within and fluidly engages the substrate 80. Upon egress of the exhaust flow 22 out of the rear face 84 outflow surface of the SCR catalyst 32, the exhaust flow 20 may be fluidly directed to an exhaust passageway such as exhaust passageway 18 which directs exhaust flow 22 out of the interior chamber 124 of the second canister 108. Alternatively, after flowing out of the rear face 84 outflow surface of the SCR catalyst 32, the exhaust flow 22 may engage and be fluidly routed into the substrate 88 of the $AMO_X$ catalyst 34 via the front face 90 thereof, wherein while resident within the $AMO_X$ catalyst 34 the catalyzed substrate 88 may oxidize residual $NH_3$ within the exhaust flow 22 before the exhaust flow 22 is directed out of the rear face 92 of the substrate 88 of the $AMO_X$ catalyst 34 and is subsequently fluidly directed to an exhaust passageway such as exhaust passageway 18 which directs exhaust flow 22 out of the interior chamber 124 of the second canister 108.

The one or more hydrolysis catalysts 28, which may include a first hydrolysis catalyst 54, provided within the aftertreatment system 20 upstream of the one or more exhaust constituent/$NO_X$ reduction treatment devices 26 may improve mixing of the exhaust flow 22 as well as the reductant 50 and reductant 50-converted $NH_3$ therein, and may additionally provide a more expedient, thorough, and/or uniform conversion or decomposition of reductant 50 to $NH_3$ within the exhaust flow 22. Furthermore providing a first hydrolysis catalyst 54 as disclosed herein may improve the atomization, quantity, and uniformity of $NH_3$ fluidly entrained in the exhaust flow 22 and presented to the one or more exhaust constituent/$NO_X$ reduction treatment devices 26. As a result, the exhaust flow 22 may have a greater amount of converted $NH_3$ uniformly mixed and atomized therein, and thus may be fluidly communicated directly to the one or more exhaust constituent/$NO_X$ reduction treatment devices 26 with a reduced amount of mixing volume, thereby eliminating the requirement of a lengthy mixing pipe and/or an increased interior mixing volume therein as well as the increased cost, package size, and attendant undesired effects of such devices such as the creation of increased backpressure and the deposits which often form therein. Furthermore, in addition to the first hydrolysis catalyst 54, the one or more hydrolysis catalysts 28 can include a second hydrolysis catalyst 62 upstream of and adjacent to the first hydrolysis catalyst 54, wherein the second hydrolysis catalyst 62 can be in adjacent fluid communication with the downstream first hydrolysis catalyst 54 which can provide additional mixing of the exhaust flow 22 and/or further decomposition or conversion of any additional or remaining reductant 50 into $NH_3$ provided within the exhaust flow 22.

In particular, in contrast to aftertreatment systems which may utilize a mixing pipe or other type of exhaust conduit which may extend between oppositely oriented ends of one or more canisters, may include a total axial length and/or mixing volume which may be longer than the length of least one of the canisters, and may additionally include mixing devices therein, the interior mixing volume 102 of the exhaust conduit 96 of the present aftertreatment system 20 can be reduced by between 25-50%. In one embodiment, as provided above, the 25-50% reduced interior mixing volume 102 of the exhaust conduit 96 can be defined, in part, by the interior mixing volume 102 having a total axial or longitudinal interior length 104 extending from a first or upstream end 98 to a second or downstream end 100 which is no greater than, or in one embodiment can be less than, the length 134 of the first canister 106 and additionally, or alternatively, the length 136 of the second canister 108. In one embodiment, in addition to a reduced length 104 as provided above, the 25-50% reduced interior mixing volume 102 of the exhaust conduit 96 can be defined, in part, by the exhaust conduit 96 and the interior mixing volume 102 therein having a substantially straight, rectilinear axial longitudinal interior length 104 and thus extending directly and/or substantially linearly from the downstream end 120 of the first canister 106 to an adjacent, aligning, proximate, or otherwise non-oppositely oriented upstream end 126 of the second canister 108. Furthermore, with this configuration, at least one of the one of the one or more exhaust constituent/$NO_X$ reduction treatment devices 26, which can be an SCRF catalyst 30 positioned at or adjacent to the upstream end 126 of the second canister 108 as well as the second or downstream end 100 of the exhaust conduit 96, may be positioned within aftertreatment system 20 at an increased thermal and fluid proximity to the upstream end of the aftertreatment system 20.

Additionally, the distribution of the SCR type catalyst material between the SCRF catalyst 30 and SCR catalyst 32 may provide advantageous packaging options as well as additional SCR catalyst function and $NO_X$ reduction. In particular, the distribution of SCR type catalyst material between the combined filtration and reduction substrate 72 of the SCRF catalyst 30, which in one embodiment can be a low differential pressure wall flow DPF substrate wash coated with a first amount of SCR type catalyst material; and the catalyzed substrate 80 of the SCR catalyst, which in one embodiment can be a flow-through substrate extruded or wash coated (or otherwise impregnated) with a second amount of the SCR type catalyst material may provide an increased total amount of SCR type catalyst material in the aftertreatment system 20, may provide reduced backpressure as a result of the distribution of the SCR type catalyst material between these two catalysts, and may thereby provide an even greater increase in $NO_X$ conversion efficiency. In addition, the total amount of SCR type catalyst material in the aftertreatment system 20, the $NO_X$ conversion efficiency, and the capacity to provide reduced backpressure may further be increased in embodiments wherein the SCR type catalyst material is distributed between the SCRF catalyst 30 and SCR catalyst 32 which may have increased diameters or widths 78, 86, which can be greater than diameters or widths 70 of each of the one or more hydrolysis catalysts 28, and additionally, or alternatively, can be greater than the diameter or width 46 of the oxidation catalyst 36, if included.

Furthermore, in embodiments wherein each of the first hydrolysis catalyst 54 and the second hydrolysis catalyst 62, if provided, may have a uniformly reduced diameter or width 70 and each of the substrates 56, 64 may be metallic and/or may additionally be low differential pressure and density, high surface area metallic substrates, these low differential pressure substrates may provide a further reduction in backpressure as well as a reduction in package size and cost of the first canister 106 which may have a diameter or width 130 which is substantially defined and correspondingly reduced by the reduced diameter or width 70 of each of the one or more hydrolysis catalysts 28, and optionally the reduced diameter or width 46 of the oxidation catalyst 36.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. An aftertreatment system comprising:
a hydrolysis catalyst disposed within a first canister and adjacent to a downstream end of the first canister;
a nozzle positioned to inject reductant into the first canister upstream of the hydrolysis catalyst;
a particulate collection device disposed within a second canister and adjacent to an upstream end of the second canister, the particulate collection device catalyzed to promote $NO_X$ reduction in the presence of the reductant;
a reduction device disposed within the second canister and downstream of the particulate collection device the reduction device catalyzed to promote $NO_X$ reduction in the presence of the reductant;
an exhaust conduit extending from the downstream end of the first canister to the upstream end of the second canister; and
an interior volume within the exhaust conduit extending from an upstream end adjacent to and in fluid communication with the hydrolysis catalyst to a downstream end adjacent to and in fluid communication with the particulate collection device, wherein a length of the interior volume within the exhaust conduit is no greater than one or more of a length of the first canister and a length of the second canister, and wherein the particulate collection device includes a first amount between 0.95 g/in$^3$-2.5 g/in$^3$ of a selective catalytic reduction type catalyst material, and the reduction device includes a second amount of a selective catalytic reduction type catalyst material.

2. The aftertreatment system of claim 1 wherein the second amount of the selective catalytic reduction type catalyst material is between 1.5 g/in$^3$-2.5 g/in$^3$.

3. A power system comprising:
a combustion engine;
an exhaust passageway connected to receive an exhaust flow from the combustion engine and fluidly communicate the exhaust flow to an aftertreatment system;
said aftertreatment system including a first canister having an upstream end connected in fluid communication with the exhaust passageway, a second canister, and an exhaust channel, the exhaust channel extending from a downstream end of the first canister to an upstream end of the second canister;
a hydrolysis catalyst disposed within the first canister adjacent to the downstream end of the first canister;
a nozzle positioned to inject reductant into the first canister upstream of the hydrolysis catalyst;
a particulate collection device disposed within the second canister adjacent to an upstream end of the second canister, the particulate collection device catalyzed to promote $NO_X$ reduction in the presence of the reductant;
a reduction device disposed within the second canister downstream of the particulate collection device, the reduction device catalyzed to promote $NO_X$ reduction in the presence of the reductant; and
an internal volume of an exhaust conduit fluidly communicating the exhaust flow from an upstream end adjacent to and in fluid communication with a rear face of the hydrolysis catalyst to a downstream end adjacent to and in fluid communication with a front face of the particulate collection device.

4. The power system of claim 3 wherein the internal volume of the exhaust conduit includes an internal axial length extending from the upstream end to the downstream end of the internal volume of the exhaust conduit.

5. The power system of claim 4 wherein a residence time of an exhaust flow within the internal volume of the exhaust conduit fluidly communicated from the hydrolysis catalyst to the particulate collection device is defined by the internal axial length of the internal volume of the exhaust conduit.

6. The power system of claim 5 wherein the internal axial length of the internal volume of the exhaust conduit is no greater than one or more of a length of the first canister and a length of the second canister.

7. The power system of claim 6 wherein a diameter of the second canister is greater than a diameter of the first canister.

8. The power system of claim 7 wherein a longitudinal axis of the exhaust conduit is perpendicular to one or more of a longitudinal axis of the first canister and a longitudinal axis of the second canister.

9. The power system of claim 8 wherein the longitudinal axis of the first canister is parallel to the longitudinal axis of the second canister.

10. The power system of claim 7 wherein the particulate collection device includes a first amount of a selective catalytic reduction type catalyst material and the reduction device includes a second amount of selective catalytic reduction type catalyst material.

11. The power system of claim 10 wherein the first amount of a selective catalytic reduction type catalyst material is between 0.95 g/in$^3$-2.5 g/in$^3$ and the second amount of a selective catalytic reduction type catalyst material is between 1.5 g/in$^3$-2.5 g/in$^3$.

12. The power system of claim 11 additionally comprising a second hydrolysis catalyst disposed within the first canister upstream of the first hydrolysis catalyst and downstream of the nozzle.

13. The power system of claim 12 additionally comprising a diesel oxidation catalyst disposed within the first canister adjacent to the upstream end of the first canister and upstream of the nozzle.

14. An aftertreatment system comprising:
a first hydrolysis catalyst in fluid communication with an exhaust flow directed through the aftertreatment system;
a nozzle positioned to inject reductant into the exhaust flow and upstream of the first hydrolysis catalyst;
a particulate collection device catalyzed to promote $NO_X$ reduction in the presence of the reductant;
an exhaust conduit having an internal volume, the internal volume of the exhaust conduit fluidly communicating the exhaust flow from an upstream end adjacent to and in fluid communication with a rear face of the first hydrolysis catalyst to a downstream end adjacent to and in fluid communication with a front face of the particulate collection device;
a second hydrolysis catalyst upstream of the first hydrolysis catalyst and downstream of the nozzle;
a diesel oxidation catalyst upstream of the nozzle; and a reduction device catalyzed to promote $NO_X$ reduction in the presence of the reductant downstream of the particulate collection device.

15. The aftertreatment system of claim 14 wherein the particulate collection device includes a first amount of a selective catalytic reduction type catalyst material between 0.95 g/in3-2.5 g/in3 and the reduction device includes a second amount of selective catalytic reduction type catalyst material between 1.5 g/in3-2.5 g/in3.

16. An aftertreatment system comprising:
a first canister having upstream and downstream ends;
a first hydrolysis catalyst disposed adjacent to the downstream end of the first canister;
a nozzle positioned to inject reductant into the first canister and upstream of the first hydrolysis catalyst;
a second canister having upstream and downstream ends;
a particulate collection device disposed adjacent to the upstream end of the second canister, the particulate collection device catalyzed to promote $NO_X$ reduction in the presence of the reductant;
an exhaust conduit extending from the downstream end of the first canister to the upstream end of the second canister;
a second hydrolysis catalyst positioned upstream of the first hydrolysis catalyst and downstream of the nozzle;
a diesel oxidation catalyst upstream of the nozzle; and
an interior volume within the exhaust conduit extending from an upstream end adjacent to and in fluid communication with the first hydrolysis catalyst to a downstream end adjacent to and in fluid communication with the particulate collection device.

* * * * *